No. 854,772. PATENTED MAY 28, 1907
J. B. TAYLOR.
REVERSING THE POLARITY OF DYNAMO ELECTRIC MACHINES.
APPLICATION FILED SEPT. 20, 1904.
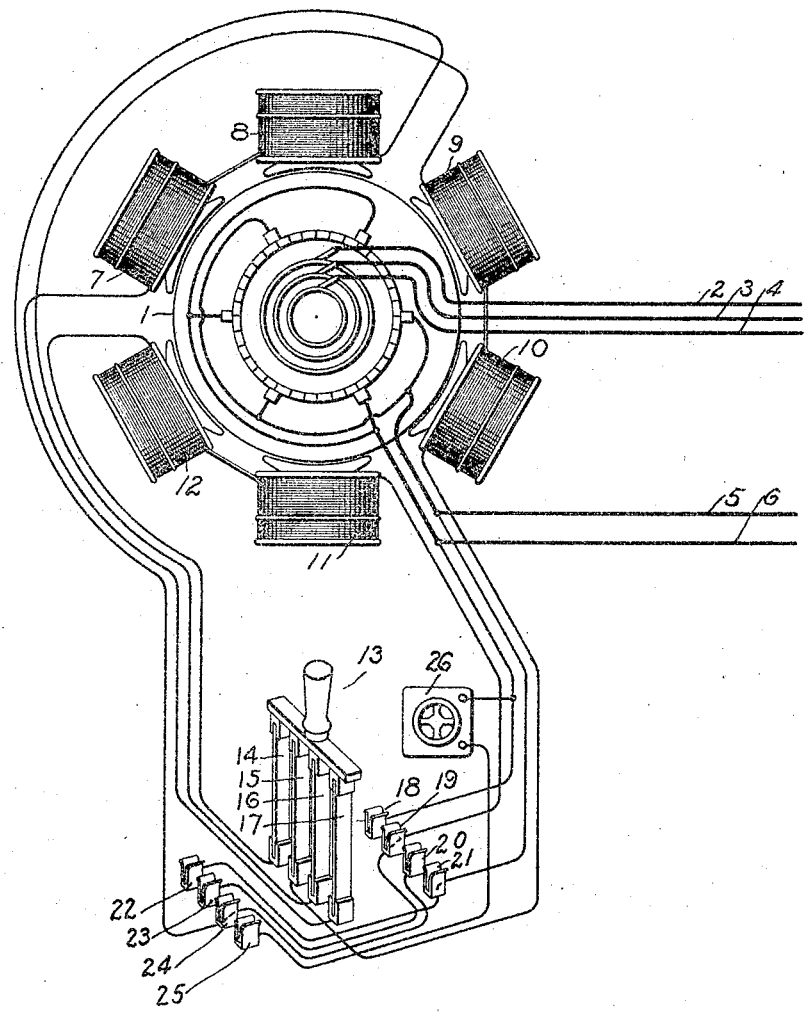
WITNESSES:
INVENTOR:
John B. Taylor,
By Albert G. Davis
Atty.

UNITED STATES PATENT OFFICE.

JOHN B. TAYLOR, OF SCHENECTADY, NEW YORK, ASSIGNOR TO GENERAL ELECTRIC COMPANY, A CORPORATION OF NEW YORK.

REVERSING THE POLARITY OF DYNAMO-ELECTRIC MACHINES.

No. 854,772.  Specification of Letters Patent.  Patented May 28, 1907.

Application filed September 29, 1904. Serial No. 226,568.

*To all whom it may concern:*

Be it known that I, JOHN B. TAYLOR, a citizen of the United States, residing at Schenectady, county of Schenectady, State of New York, have invented certain new and useful Improvements in Reversing the Polarity of Dynamo-Electric Machines, of which the following is a specification.

My present invention comprises a method of changing the polarity of self-exciting synchronous machines such as rotary converters. To accomplish this result I provide means for reversing the field connections of the machine, and by suitable manipulation produce the change of polarity desired.

My invention will be better understood by reference to the following description taken in connection with the accompanying drawings representing diagrammatically one embodiment of my invention.

The scope of the invention will be pointed out with particularity in the appended claims.

In the drawings, the armature of a rotary converter is indicated conventionally at 1. The alternating current mains associated with the armature are shown at 2, 3 and 4, and the corresponding direct current mains at 5 and 6. The field coils of the rotary converter are shown at 7, 8, 9, 10, 11 and 12, but the field magnet frame, for convenience of illustration, is omitted. These coils are connected to a reversing switch 13 by which the current through the coils may not only be reversed but its circuit between adjacent coils interrupted. By thus breaking up the field circuit, the production therein of high voltages by the transformer action of the current in the armature during starting or at other times, and a resultant danger of break down to the field insulation, is prevented. The reversing switch is such as to perform the double operation of breaking up the field when the switch is in the open circuit position and of reversely connecting the field when thrown from one closed position to the other.

The movable switch arms of the reversing switch are indicated at 14, 15, 16 and 17, and these coöperate with two sets of fixed contacts, one set being numbered 18, 19, 20 and 21, and the other 22, 23, 24 and 25. It will be seen that when the switch is thrown so as to engage the contacts 22 to 25, the field coils are connected in series with each other across the direct current leads 5 and 6, and with the shunt field resistance box 26 included. When thrown to the other position the coils are connected directly across the leads 5 and 6, with the resistance box omitted, and in such a manner as to be traversed by current of the opposite direction. In the intermediate position of the switch the circuit of the field coils is not only opened but is broken up so that at most two coils are in series with each other. The voltage which may be induced in these coils by the armature currents during starting is not sufficiently high to endanger insulation, whereas if all of the coils were in series, although on open circuit, the voltage might attain dangerous values.

In order to explain the operation of my invention, let it be assumed that the rotary converter has been brought up to synchronism. This is preferably done by starting the converter from the alternating current end at one-half or one-third normal voltage. This operation of starting is performed with the field circuit open. If the armature locks into synchronism so as to give the desired polarity across the direct current end of the machine, then the field switch is closed in normal position so as to connect the field winding across the direct current end of the machine. If, however, the machine locks into synchronism with a reversed polarity at the direct current end then, in order to reverse the polarity, I throw the field switch 13 in the opposite direction so as to connect the field coils in reverse relation to the supply current from the commutator of the machine. As the polarity of the field is thus changed the armature of the machine slips back in phase and tends to assume a position approximately one-quarter of a period behind that corresponding to normal running. As the armature drops back, the commutation which heretofore took place at the peaks of the alternating current waves, slides down these waves so to speak, until the zero point is reached. The excitation of the machine at this point becomes zero. The friction, windage, etc. acting on the armature tend to cause the armature to drop back in phase still farther, whereupon the direct current voltage tends to increase from zero in the opposite direction. The reverse polarity of the field thus produced opposes any further shift in phase, and the machine tends thus to remain in a condition in which the commutation takes place at a point just sufficiently removed from the zero point of the alternating current waves to hold the armature in equilibrium. If now, the field switch be reversed, the armature will then be attracted backward and will lock into position one pole back of that corresponding to the initial condition. This new position, however, corresponds to an opposite polarity of the direct current side of the machine, and the desired result is thus accomplished.

In order to facilitate the operation of reversing the polarity of the machine, I arrange the switch connections so that the resistance box 27 is out of circuit when the first throw of the reversing switch is made. This I do in order that the field strength, with the small voltage available under this condition, may be as strong as possible. The return throw of the switch to normal position puts the box in circuit ready for use.

I am aware that it has been proposed to shift the phase of a synchronous machine half a cycle by reversing the field. This, however, has been done with separately excited machines and is a problem entirely different from that herein described for the reason that the excitation is not altered as the phase is shifted.

What I claim as new and desire to secure by Letters Patent of the United States, is:

1. The method of reversing the polarity of a self exciting alternating current machine, which consists in reversely connecting the field circuit, and completing the operation by throwing the connections of the field into the normal running position.

2. The method of reversing the polarity of a rotary converter, which consists in exciting the field so as to cause the armature to slip back in phase more than one-quarter of a period, thereby causing the voltage of the converter to drop to zero and rise slightly in the opposite direction, and then reversing the direction of current flow in the field windings.

3. The method of reversing the polarity of a self exciting alternating current machine driven by alternating currents, which consists in connecting the field reversely and then in normal relation to the source of excitation.

4. The method of reversing the polarity of a rotary converter which consists in first producing a reversed polarity of the field, allowing the direct current voltage to fall to zero and then to rise slightly in the opposite direction, and then reversing the field excitation.

5. The method of reversing the polarity of a rotary converter which consists in reversely closing the field circuit at a multiplicity of points, and then changing the connections to their normal running condition.

6. The method of changing the polarity of a rotary converter provided with a field rheostat, which consists in reversely connecting the field and at the same time omitting the rheostat from circuit, and then changing the circuits to their normal condition with the rheostat in circuit.

7. The combination of a dynamo electric machine having a plurality of field poles, and means for opening the circuit of the field at one or more points between the field poles and then reversely closing the circuit.

8. The combination of a dynamo electric machine provided with a plurality of field poles, a rheostat in the field circuit, means for closing the field circuit so as to leave the rheostat connected in circuit, and for reversing connections so as to leave the rheostat out of circuit.

In witness whereof I have hereunto set my hand this 20th day of September, 1904.

JOHN B. TAYLOR.

Witnesses:
 BENJAMIN B. HULL,
 HELEN ORFORD.